United States Patent
Ekici et al.

(10) Patent No.: US 8,965,373 B2
(45) Date of Patent: Feb. 24, 2015

(54) MOBILE TERMINATED CALL ESTABLISHMENT DURING INTER RADIO ACCESS TECHNOLOGY (IRAT) RE-DIRECTION

(71) Applicants: Ozgur Ekici, San Diego, CA (US); Khaled Jazzar, San Diego, CA (US)

(72) Inventors: Ozgur Ekici, San Diego, CA (US); Khaled Jazzar, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 116 days.

(21) Appl. No.: 13/730,330

(22) Filed: Dec. 28, 2012

(65) Prior Publication Data

US 2014/0162651 A1 Jun. 12, 2014

Related U.S. Application Data

(60) Provisional application No. 61/734,648, filed on Dec. 7, 2012.

(51) Int. Cl.
*H04W 36/14* (2009.01)

(52) U.S. Cl.
CPC ................................ *H04W 36/14* (2013.01)

USPC ............................................. 455/436; 370/329

(58) Field of Classification Search
CPC ............................. H04W 36/14; H04W 28/04
USPC .................................. 455/436, 458; 370/329
See application file for complete search history.

(56) References Cited

U.S. PATENT DOCUMENTS

| | | | | |
|---|---|---|---|---|
| 2010/0048210 | A1* | 2/2010 | Iwamura et al. | 455/436 |
| 2013/0109391 | A1* | 5/2013 | Lee et al. | 455/436 |

* cited by examiner

*Primary Examiner* — Phuoc H Doan

(74) *Attorney, Agent, or Firm* — Garlick & Markison; Shayne X. Short

(57) ABSTRACT

Mobile terminated call establishment during inter radio access technology (IRAT) re-direction. Handovers between different respective radio access technologies (RATs) may be performed (e.g., IRAT redirection procedure) such that a given wireless communication device may be in communication with a given RAT cell, and then switch from that RAT cell to another RAT cell (e.g., a target RAT cell). This transition may be from a 3G cell to a target 4G cell. During such a redirection procedure, there may be some instances in which the target RAT cell may not be available immediately, and a device can check back with the first/original RAT cell during the search for the target RAT cell. That is to say, there may be some duration of time during the search for the target RAT cell in which that particular cell may not be available, and the device checks for pages in the first/original RAT cell.

20 Claims, 8 Drawing Sheets

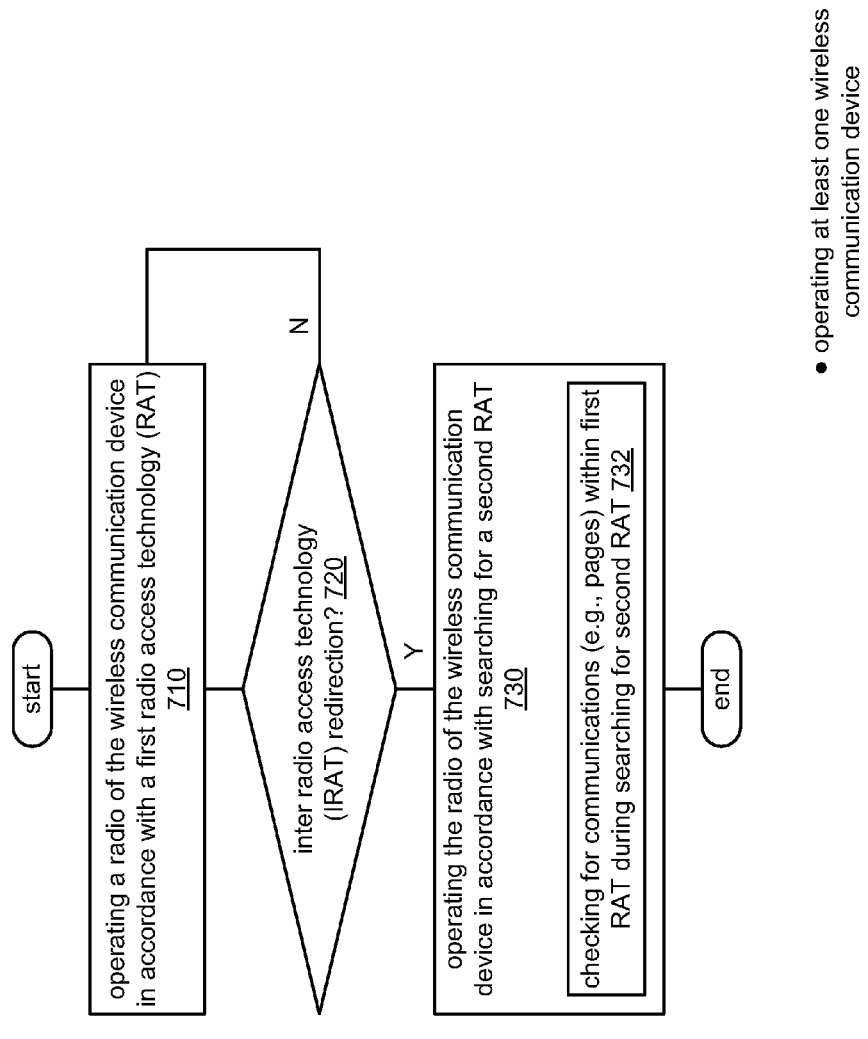

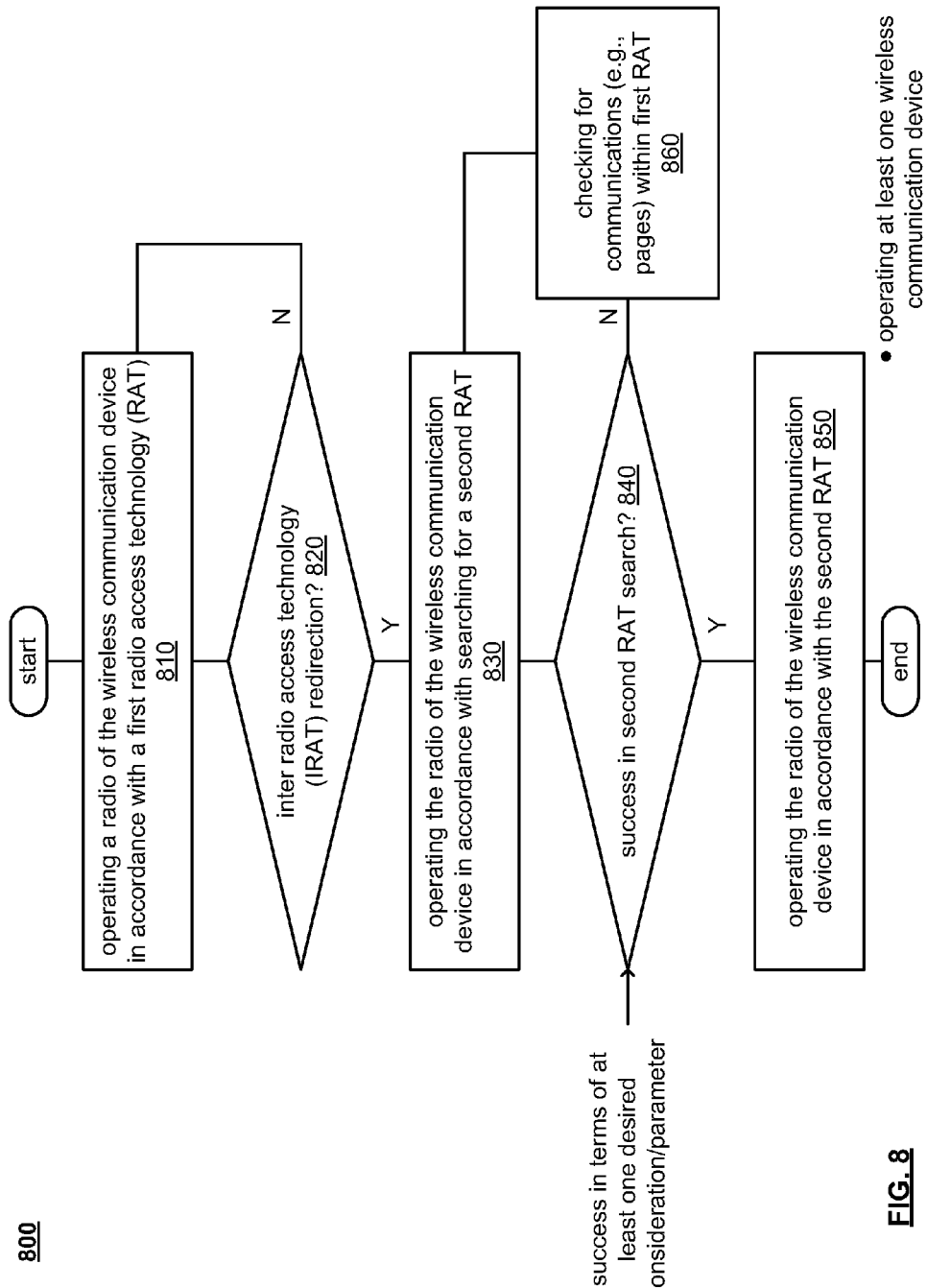

MOBILE TERMINATED CALL ESTABLISHMENT DURING INTER RADIO ACCESS TECHNOLOGY (IRAT) RE-DIRECTION

CROSS REFERENCE TO RELATED PATENTS/PATENT APPLICATIONS

Provisional Priority Claims

The present U.S. Utility Patent Application claims priority pursuant to 35 U.S.C. §119(e) to the following U.S. Provisional Patent Application which is hereby incorporated herein by reference in its entirety and made part of the present U.S. Utility Patent Application for all purposes:
1. U.S. Provisional Patent Application Ser. No. 61/734,648, entitled "Mobile terminated call establishment during inter radio access technology (IRAT) re-direction,", filed 12 Jul. 2012.

BACKGROUND OF THE INVENTION

1. Technical Field of the Invention

The invention relates generally to wireless communication systems; and, more particularly, it relates to operation in accordance with various radio access technologies (RATs).

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), radio frequency identification (RFID), Enhanced Data rates for GSM Evolution (EDGE), General Packet Radio Service (GPRS), Universal Mobile Telecommunications System (UMTS), Long Term Evolution (LTE, often marketed as 4G LTE), and/or other(s), and/or variations thereof.

Depending on the type of wireless communication system, a wireless communication device, such as a cellular telephone, two-way radio, personal digital assistant (PDA), personal computer (PC), laptop computer, home entertainment equipment, RFID reader, RFID tag, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system or a particular RF frequency for some systems) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to an antenna and includes a low noise amplifier, one or more intermediate frequency stages, a filtering stage, and a data recovery stage. The low noise amplifier receives inbound RF signals via the antenna and amplifies them. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

While transmitters generally include a data modulation stage, one or more IF stages, and a power amplifier, the particular implementation of these elements is dependent upon the data modulation scheme of the standard being supported by the transceiver. For example, if the baseband modulation scheme is Gaussian Minimum Shift Keying (GMSK), the data modulation stage functions to convert digital words into quadrature modulation symbols, which have a constant amplitude and varying phases. The IF stage includes a phase locked loop (PLL) that generates an oscillation at a desired RF frequency, which is modulated based on the varying phases produced by the data modulation stage. The phase modulated RF signal is then amplified by the power amplifier in accordance with a transmit power level setting to produce a phase modulated RF signal.

As another example, if the data modulation scheme is 8-PSK (phase shift keying), the data modulation stage functions to convert digital words into symbols having varying amplitudes and varying phases. The IF stage includes a phase locked loop (PLL) that generates an oscillation at a desired RF frequency, which is modulated based on the varying phases produced by the data modulation stage. The phase modulated RF signal is then amplified by the power amplifier in accordance with the varying amplitudes to produce a phase and amplitude modulated RF signal.

As yet another example, if the data modulation scheme is x-QAM (16, 64, 128, 256 quadrature amplitude modulation), the data modulation stage functions to convert digital words into Cartesian coordinate symbols (e.g., having an in-phase signal component and a quadrature signal component). The IF stage includes mixers that mix the in-phase signal component with an in-phase local oscillation and mix the quadrature signal component with a quadrature local oscillation to produce two mixed signals. The mixed signals are summed together and filtered to produce an RF signal that is subsequently amplified by a power amplifier.

In addition, when participating in wireless communications, wireless communication devices shall operate using radio access technologies (RATs) (e.g., GSM, UMTS, LTE, etc.). In addition, various wireless communication devices have capability to function in multiple RATs (e.g., such wireless communication devices are sometimes referred to as multi-mode devices), and can be directed from one to another (e.g., such as when requested by the network). The present art does not provide an adequate means by which communications may be effectuated sufficiently well in accordance with such RAT operations.

BRIEF DESCRIPTION OF THE SEVERAL VIEWS OF THE DRAWINGS

FIG. 6, FIG. 7, and FIG. 8 illustrate various embodiments of methods for operating one or more communication devices.

DETAILED DESCRIPTION OF THE INVENTION

Within communication systems, signals are transmitted between various communication devices therein. The goal of digital communications systems is to transmit digital data from one location, or subsystem, to another either error free or with an acceptably low error rate. Some embodiments of communication systems are implemented to support communications via one or more wireless links.

Figure 1:
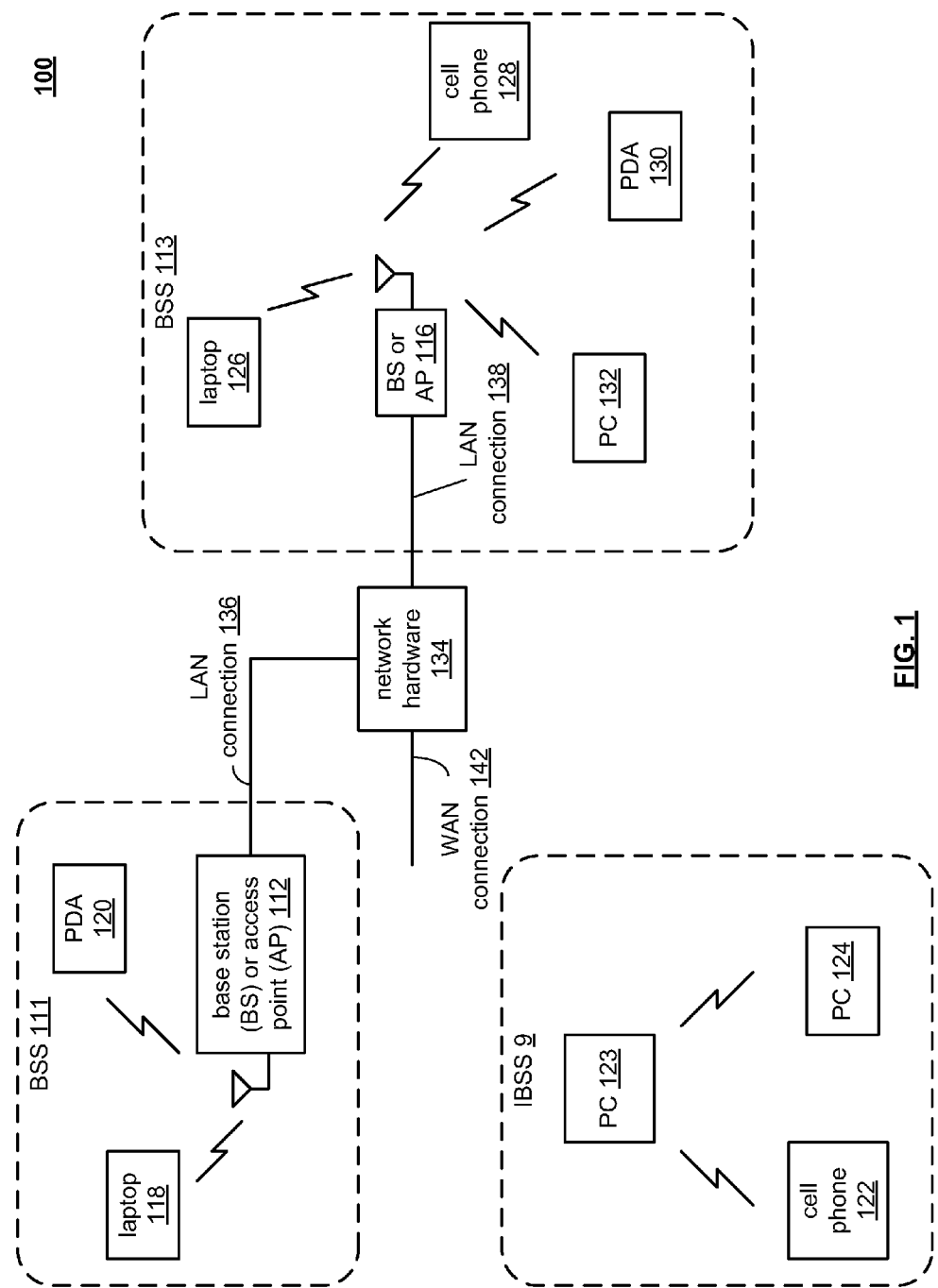
FIG. 1 and FIG. 2 illustrate various embodiments of communication systems.

FIG. 1 is a diagram illustrating an embodiment of a wireless communication system 100. The wireless communication system 100 includes a plurality of base stations and/or access points 112, 116, a plurality of wireless communication devices 118-132 and a network hardware component 134. Note that the network hardware 134, which may be a router, switch, bridge, modem, system controller, et cetera provides a wide area network connection 142 for the communication system 100. Further note that the wireless communication devices 118-132 may be laptop host computers 118 and 126, personal digital assistant hosts 120 and 130, personal computer hosts 124 and 132 and/or cellular telephone hosts 122 and 128.

Wireless communication devices 122, 123, and 124 are located within an independent basic service set (IBSS) area 9 and communicate directly (i.e., point to point). In this configuration, these devices 122, 123, and 124 may only communicate with each other. To communicate with other wireless communication devices within the system 100 or to communicate outside of the system 100, the devices 122, 123, and/or 124 need to affiliate with one of the base stations or access points 112 or 116.

The base stations or access points 112, 116 are located within basic service set (BSS) areas 111 and 113, respectively, and are operably coupled to the network hardware 134 via local area network connections 136, 138. Such a connection provides the base station or access points 112-116 with connectivity to other devices within the system 100 and provides connectivity to other networks via the WAN connection 142. To communicate with the wireless communication devices within its BSS 111 or 113, each of the base stations or access points 112-116 has an associated antenna or antenna array. For instance, base station or access point 112 wirelessly communicates with wireless communication devices 118 and 120 while base station or access point 116 wirelessly communicates with wireless communication devices 126-132. Typically, the wireless communication devices register with a particular base station or access point 112, 116 to receive services from the communication system 100.

Typically, base stations are used for cellular telephone systems (e.g., advanced mobile phone services (AMPS), digital AMPS, global system for mobile communications (GSM), code division multiple access (CDMA), local multi-point distribution systems (LMDS), multi-channel-multi-point distribution systems (MMDS), Enhanced Data rates for GSM Evolution (EDGE), General Packet Radio Service (GPRS), high-speed downlink packet access (HSDPA), high-speed uplink packet access (HSUPA and/or variations thereof) and like-type systems, while access points are used for in-home or in-building wireless networks (e.g., IEEE 802.11, Bluetooth, ZigBee, any other type of radio frequency based network protocol and/or variations thereof). Regardless of the particular type of communication system, each wireless communication device includes a built-in radio and/or is coupled to a radio.

Figure 2:
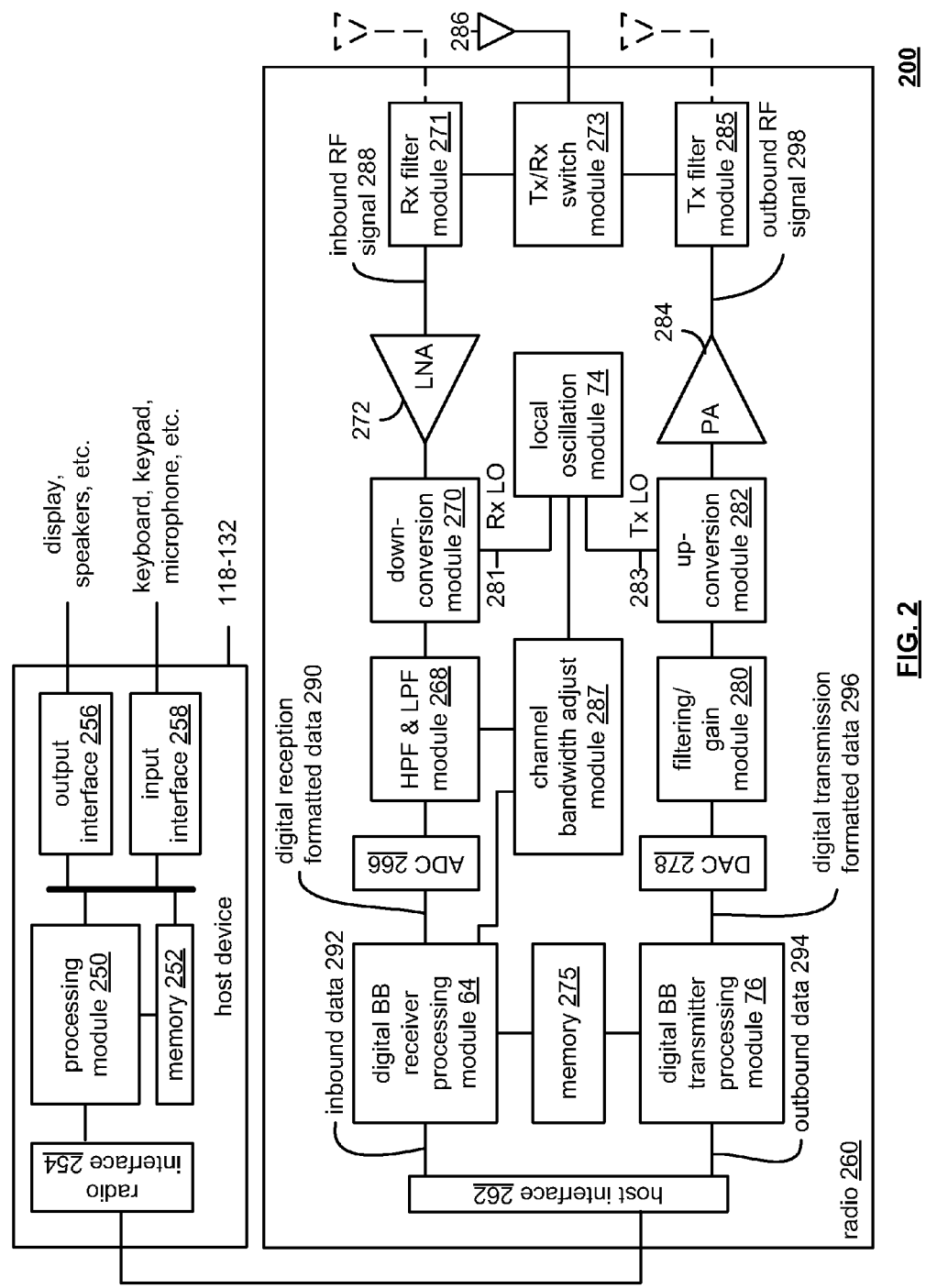

FIG. 2 is a diagram illustrating an embodiment of a wireless communication device 200 that includes the host device 118-132 and an associated radio 260. For cellular telephone hosts, the radio 260 is a built-in component. For personal digital assistants hosts, laptop hosts, and/or personal computer hosts, the radio 260 may be built-in or an externally coupled component.

As illustrated, the host device 118-132 includes a processing module 250, memory 252, a radio interface 254, an input interface 258, and an output interface 256. The processing module 250 and memory 252 execute the corresponding instructions that are typically done by the host device. For example, for a cellular telephone host device, the processing module 250 performs the corresponding communication functions in accordance with a particular cellular telephone standard.

The radio interface 254 allows data to be received from and sent to the radio 260. For data received from the radio 260 (e.g., inbound data), the radio interface 254 provides the data to the processing module 250 for further processing and/or routing to the output interface 256. The output interface 256 provides connectivity to an output display device such as a display, monitor, speakers, et cetera such that the received data may be displayed. The radio interface 254 also provides data from the processing module 250 to the radio 260. The processing module 250 may receive the outbound data from an input device such as a keyboard, keypad, microphone, et cetera via the input interface 258 or generate the data itself. For data received via the input interface 258, the processing module 250 may perform a corresponding host function on the data and/or route it to the radio 260 via the radio interface 254.

Radio 260 includes a host interface 262, digital receiver processing module 264, an analog-to-digital converter 266, a high pass and low pass filter module 268, an IF mixing down conversion stage 270, a receiver filter 271, a low noise amplifier 272, a transmitter/receiver switch 273, a local oscillation module 274, memory 275, a digital transmitter processing module 276, a digital-to-analog converter 278, a filtering/gain module 280, an IF mixing up conversion stage 282, a power amplifier 284, a transmitter filter module 285, a channel bandwidth adjust module 287, and an antenna 286. The antenna 286 may be a single antenna that is shared by the transmit and receive paths as regulated by the Tx/Rx switch 273, or may include separate antennas for the transmit path and receive path. The antenna implementation will depend on the particular standard to which the wireless communication device 200 is compliant.

The digital receiver processing module 264 and the digital transmitter processing module 276, in combination with operational instructions stored in memory 275, execute digital receiver functions and digital transmitter functions, respectively. The digital receiver functions include, but are not limited to, digital intermediate frequency to baseband conversion, demodulation, constellation demapping, decoding, and/or descrambling. The digital transmitter functions include, but are not limited to, scrambling, encoding, constellation mapping, modulation, and/or digital baseband to IF conversion. The digital receiver and transmitter processing modules 264 and 276 may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 275 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 264 and/or 276 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 260 receives outbound data 294 from the host device via the host interface 262. The host interface 262 routes the outbound data 294 to the digital transmitter processing module 276, which processes the outbound data 294 in accordance with a particular wireless communication standard (e.g., IEEE 802.11, Bluetooth, ZigBee, any other type of radio frequency based network protocol and/or variations thereof et cetera) to produce outbound baseband signals 296. The outbound baseband signals 296 will be digital base-band signals (e.g., have a zero IF) or digital low IF signals, where the low IF typically will be in the frequency range of one hundred kHz (kilo-Hertz) to a few MHz (Mega-Hertz).

The digital-to-analog converter 278 converts the outbound baseband signals 296 from the digital domain to the analog domain. The filtering/gain module 280 filters and/or adjusts the gain of the analog signals prior to providing it to the IF mixing stage 282. The IF mixing stage 282 converts the analog baseband or low IF signals into RF signals based on a transmitter local oscillation 283 provided by local oscillation module 274. The power amplifier 284 amplifies the RF signals to produce outbound RF signals 298, which are filtered by the transmitter filter module 285. The antenna 286 transmits the outbound RF signals 298 to a targeted device such as a base station, an access point and/or another wireless communication device 200.

The radio 260 also receives inbound RF signals 288 via the antenna 286, which were transmitted by a base station, an access point, or another wireless communication device. The antenna 286 provides the inbound RF signals 288 to the receiver filter module 271 via the Tx/Rx switch 273, where the Rx filter 271 bandpass filters the inbound RF signals 288. The Rx filter 271 provides the filtered RF signals to low noise amplifier 272, which amplifies the signals 288 to produce an amplified inbound RF signals. The low noise amplifier 272 provides the amplified inbound RF signals to the IF mixing module 270, which directly converts the amplified inbound RF signals into an inbound low IF signals or baseband signals based on a receiver local oscillation 281 provided by local oscillation module 274. The down conversion module 270 provides the inbound low IF signals or baseband signals to the filtering/gain module 268. The high pass and low pass filter module 268 filters, based on settings provided by the channel bandwidth adjust module 287, the inbound low IF signals or the inbound baseband signals to produce filtered inbound signals.

The analog-to-digital converter 266 converts the filtered inbound signals from the analog domain to the digital domain to produce inbound baseband signals 290, where the inbound baseband signals 290 will be digital base-band signals or digital low IF signals, where the low IF typically will be in the frequency range of one hundred kHz to a few MHz. The digital receiver processing module 264, based on settings provided by the channel bandwidth adjust module 287, decodes, descrambles, demaps, and/or demodulates the inbound baseband signals 290 to recapture inbound data 292 in accordance with the particular wireless communication standard being implemented by radio 260. The host interface 262 provides the recaptured inbound data 292 to the host device 118-132 via the radio interface 254.

As one of average skill in the art will appreciate, the wireless communication device 200 of FIG. 2 may be implemented using one or more integrated circuits. For example, the host device may be implemented on one integrated circuit, the digital receiver processing module 264, the digital transmitter processing module 276 and memory 275 may be implemented on a second integrated circuit, and the remaining components of the radio 260, less the antenna 286, may be implemented on a third integrated circuit. As an alternate example, the radio 260 may be implemented on a single integrated circuit. As yet another example, the processing module 250 of the host device and the digital receiver and transmitter processing modules 264 and 276 may be a common processing device implemented on a single integrated circuit. Further, the memory 252 and memory 275 may be implemented on a single integrated circuit and/or on the same integrated circuit as the common processing modules of processing module 250 and the digital receiver and transmitter processing module 264 and 276.

During an inter radio access technology (IRAT) redirection procedure, a given wireless communication device (e.g., user equipment (UE)) may potentially be un-reachable for more than 10 seconds as per standards requirement. In practice however, it may take even significantly longer than that, depending on the number of radio bands supported by the wireless communication device (e.g., UE). Considering typical discontinuous reception cycle (DRX) of 640 ms in commercial networks, this 10 seconds standards requirement translates into more than 15 paging cycles. Mobile devices in such scenario will be missing all the mobile terminated calls coming from the first, original or old RAT for this duration because throughout IRAT redirection procedure the UE will be searching for the new RAT and it will not be monitoring paging messages in the first, original, or old RAT where it was last registered. Considering the mobility nature of the wireless communication, such use case might be quite commonplace in commercial networks and UE missing pages will negatively impact the end user experience.

Figure 3:
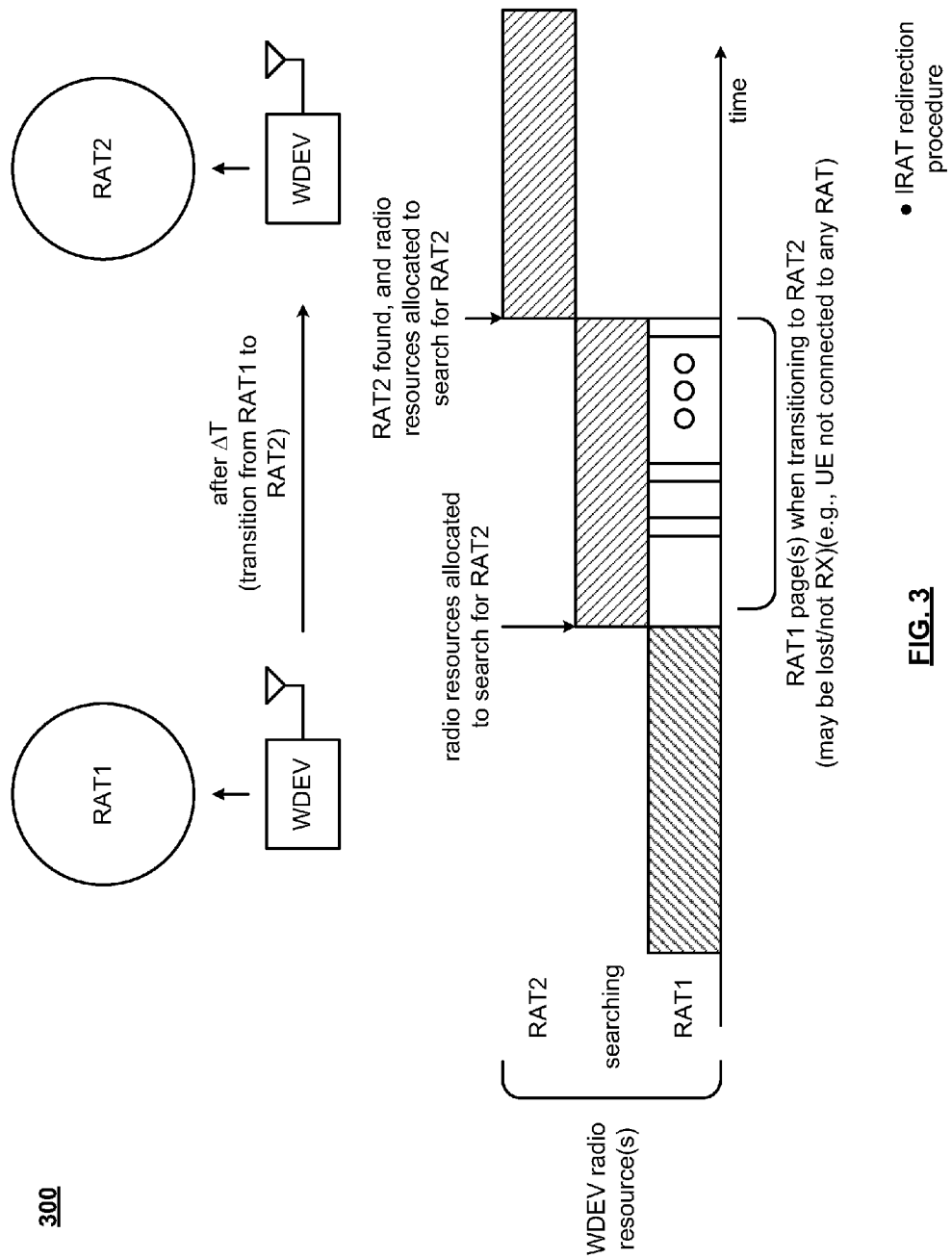
FIG. 3, FIG. 4, and FIG. 5 illustrate various embodiments of inter radio access technology (IRAT) procedures.
Figure 4:
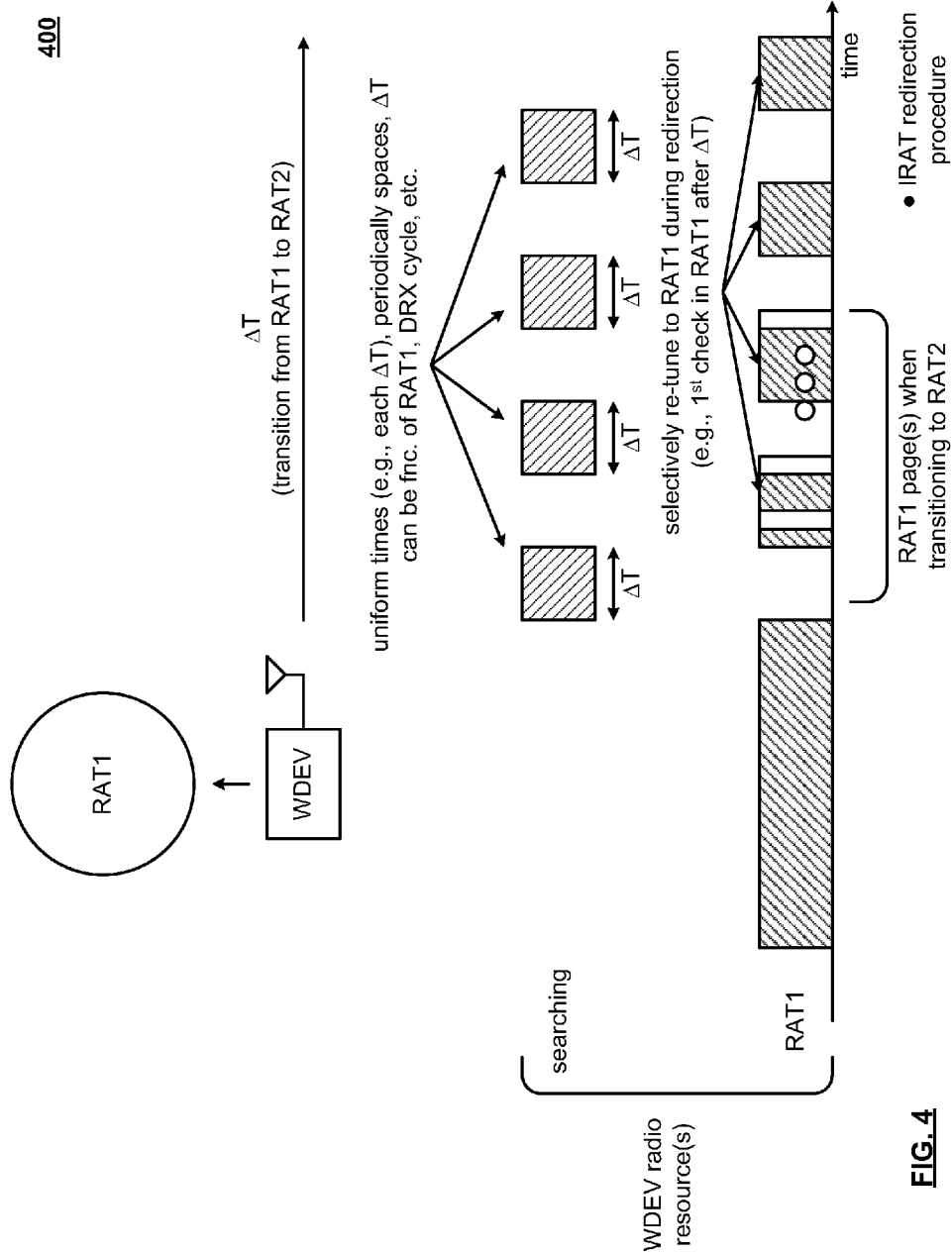
Figure 5:
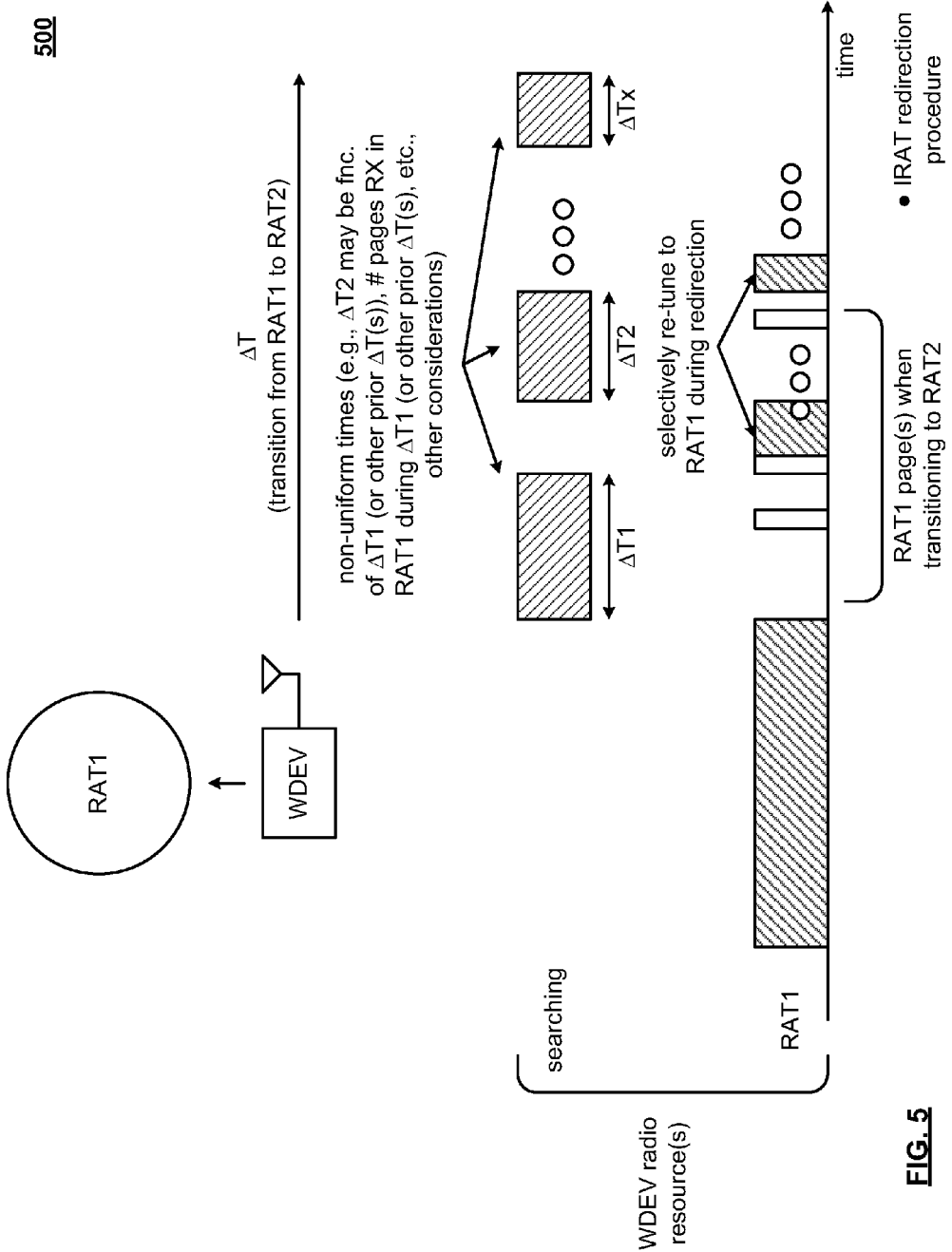

FIG. 3, FIG. 4, and FIG. 5 illustrate various embodiments 300, 400, and 500, respectively, of inter radio access technology (IRAT) procedures.

Generally seeking, a novel means is presented herein by which handovers between different respective radio access technologies (RATs) may be performed, such as with respect to a redirection procedure. For example, a given wireless communication device may be in communication with a given RAT cell, and may be performing a switching from that RAT cell to another RAT cell (e.g., a target RAT cell). In some embodiments, this transition may be from a 3G cell to a target 4G cell. During such a redirection procedure, there may be some instances in which the target RAT cell may not be available immediately. That is to say, there may be some duration of time during the search for the target RAT cell in which that particular cell may not be available. In other words, there may be a period of time during which there may be no connectivity with either the prior cell or the target cell.

For example, in the course of the cell search of the target RAT during an IRAT redirection procedure, a given wireless communication device (e.g., UE) can re-tune its radio resources to the 'old' technology (e.g., associated with the first or original RAT) for page monitoring. As an example, a single page monitoring typically takes around 16 ms in wideband code division multiple access (W-CDMA) networks. As may be understood, the communication device will then not miss any paging or other communications during such an IRAT redirection operation. Due to the relatively short nature of DRX/Paging monitoring, such implementation will not deleteriously affect the wireless communication device (e.g., UE) search performance whereas providing 100% connectivity during the procedure regardless how long it takes.

Referring to the embodiment 300 of FIG. 3, as may be seen with respect to this diagram, a given wireless communication device may include respective radio resources that may be directed to effectuate communications in accordance with a first RAT and a second RAT. While many of the illustrative embodiments herein are directed towards two respective RATs, it is of course noted that any such embodiment of the invention may also be directed towards more than two respective RATs without departing from the scope and spirit of the invention.

As may be seen with respect to this diagram, during a redirection procedure between a first RAT and a second RAT, the radio resources associated with the wireless communication device may be provisioned and operable for those to respective RATs. Considering the timing diagram, in which the wireless communication device radio resources are directed toward supporting operation in accordance with the first RAT during a first time period, and then switching to supporting operation in accordance with the second RAT during a second time period.

During the redirection procedure, particularly when the wireless communication device is attempting to contact with the target RAT cell (e.g., during a searching time or time period), there may be a period in which the wireless communication device is neither connected to the original RAT cell or the target RAT cell, (e.g., in that, it is searching for the target RAT cell). If the mobile device is paged in the first or original RAT during the searching for the second RAT cell, they shall be lost (e.g., because the radio resources of the wireless communication device (e.g., UE) are no longer directed to the first or original RAT). Generally speaking, the radio resources of a wireless communication device (e.g., UE) can be allocated to the first or original RAT cell, the second or the target RAT cell, or searching for a given RAT (e.g., the second or target RAT cell).

That is to say, if a given device is in process of a redirection procedure between a first RAT cell and a second RAT cell, then after the device has made this switch in provisioning its respective radio resources from the first RAT to the second RAT, and if there are any pages associated with the first RAT when the device is transitioning to the second RAT, those pages shall be lost and not received by the device as the wireless communication device does not allocate nay radio resources to monitor the considered paging messages during IRAT re-direction procedure.

During IRAT re-direction procedure, the wireless communication device (e.g., UE) is considered to be in the coverage of first, original, or old RAT until it successfully performs tracking area update (e.g., in Long Term Evolution (LTE)) or routing area update (in W-CDMA or GERAN [GSM EDGE Radio Access Network, where GSM is "Global System for Mobile Communications, originally Groupe Special Mobile"]) procedure in the target RAT. Therefore, during re-direction procedure if the network wanted to reach to the wireless communication device (e.g., UE), it will page the wireless communication device (e.g., UE) in the first, original, or old RAT where the wireless communication device (e.g., UE) performed the registration the last.

An IRAT re-direction procedure can take quite a long time depending on if the target cell is available, suitable or simply low signal level. Standards provided upper limit to some IRAT re-directions. For instance, during W-CDMA to LTE re-direction procedure, as per 3GPP TS 25.331 section 8.5.2, this duration is indicated as 10 seconds+the time the wireless communication device (e.g., UE) to complete the search on the other frequencies of the target RAT. Similarly for GERAN to LTE re-direction procedure, as per 3GPP TS 45.008 section 6.7.1 this duration is indicated as 10 seconds as well.

Some other re-direction procedures however do not have any time limit. For instance, LTE to WCDMA or LTE to GERAN re-direction procedures do not define any time limit where after exceeding this pre-defined limit the UE will abort re-direction procedure.

The legacy wireless communication devices (e.g., UEs) on the market will be bound by the requirements provided by the standards and in a scenario where the wireless communication device (e.g., UE) is having problem finding the targeted cell and not implemented background paging of the first, original, or old RAT will be un-reachable for this IRAT re-direction duration.

Referring to the embodiment 400 of FIG. 4, during an IRAT redirection procedure, a device may provision its radio resources back to the original RAT. Such operation may be performed selectively by retuning the radio resources of the device back to the original RAT during the searching for the target RAT. In some embodiments, additional radio resources may be provisioned to allow for the checking back with the original RAT during the redirection procedure. Alternatively, the same radio resources may be selectively provisioned to check for any paging or communications associated with the first RAT when transitioning to the second RAT within an IRAT redirection procedure.

The constraints and parameters by which such checking with the first RAT may be made may be varied and defined differently for different applications. A designer is provided great latitude in determining the particular conditions by which the checking back with the first RAT during the IRAT redirection procedure are to be made. For example, in one embodiment, after the elapse of a particular period of time (e.g., which may be predetermined, adaptively determined based on operating conditions, etc.), the device may selectively retune to the first RAT. For example, such a period of time may be associated with a failure to connect successfully with the target RAT. That is to say, if the device has failed to connect successfully with the target RAT in a particular period of time, then the device may check the original or first RAT. Generally speaking, when doing a search for a second or target RAT, the wireless communication device may go back and check the first or original RAT, checking for paging messages to ensure that the device they successfully effectuate communications. As an example, considering a device of a wireless communication device (e.g., a cellular telephone, a mobile communication device, etc.), during a redirection procedure between a first RAT and a second RAT, the device may be implemented to perform effective checking of any communication associated with the first RAT to ensure that such communications are effectively received and may be serviced (as e.g., a user of such a device will be able to pick up a call communicated using the first RAT even if a device has begun the process or is within the process of an IRAT redirection procedure).

Referring to the embodiment 500 of FIG. 5, the respective times and time periods in which a given device checks for any communication associated with the first RAT need not necessarily be uniform or evenly spaced (periodic) such as are described with respect to the previous embodiment. For example, a given time period during which a device checks for any communications associated with the first or original RAT when performing an IRAT redirection procedure to establish communications in accordance with a second or target RAT may be of different respective durations, apart differently, etc. In some instances, a given time period in which a device continues checking for that second or target RAT may be a function of one or more prior time periods in which the device was checking for that second or target RAT. For example, if a given device is having little or no success in establishing connectivity in accordance with the second or target RAT, then the respective time period in which the device will search for that second or target RAT may be adapted to be of relatively lower or higher duration. In other words, device may adaptively determine that connectivity with the second or target RAT may not be successfully made. As such, the device may check more frequently for any communications which may be provided to it using the first or original RAT.

Generally speaking, any of a number of respective considerations may be employed to direct the manner by which a device checks back with the first or original RAT during an IRAT redirection procedure that is to effectuate connectivity in general. Various examples of such considerations may include, but are not limited to, the prior or historical level of success and quickness with which connectivity has been made with the second or target RAT, local and/or remote operating conditions associated with the device and/or the system with which the device is interacting with, the amount of interference detected, and/or any other desired one or more considerations.

As may be understood, by checking back with the first or original RAT, a device is much less likely to miss any communications which may be made via that first or original RAT during an IRAT redirection procedure to transition to supporting communications with a second or target RAT.

Figure 6:
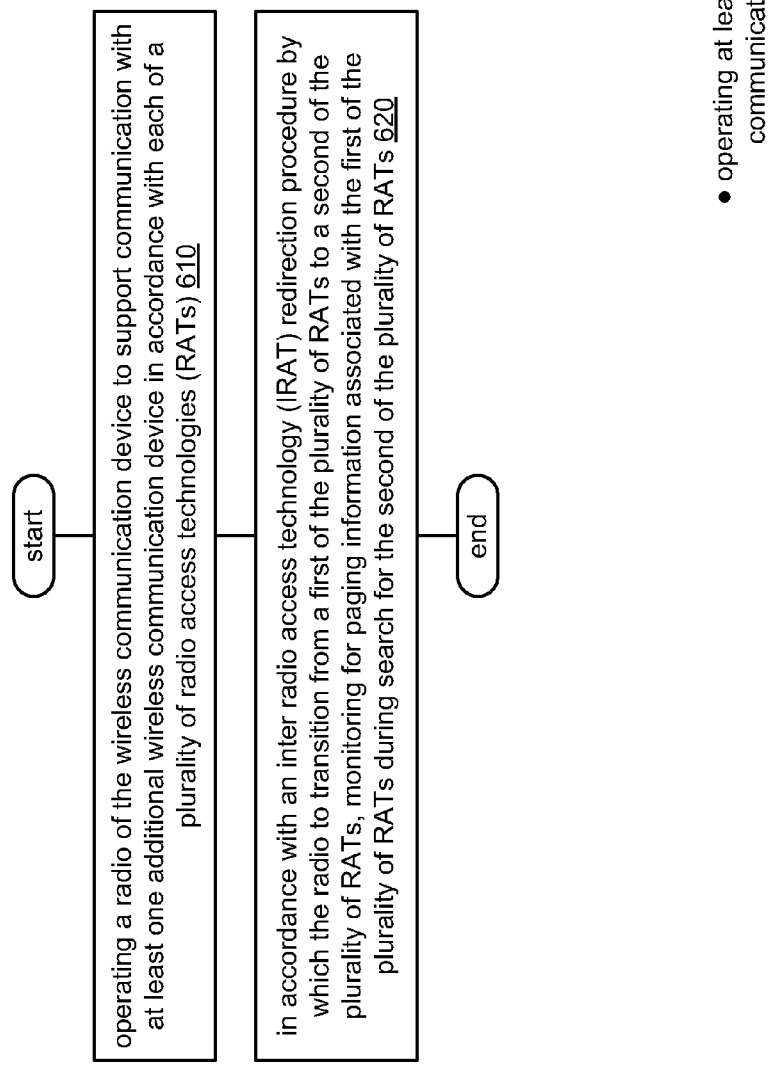

FIG. 6, FIG. 7, and FIG. 8 illustrate various embodiments of methods for operating one or more communication devices.

Referring to method 600 of FIG. 6, the method 600 begins by operating a radio of the wireless communication device to support communication with at least one additional wireless communication device in accordance with each of a plurality of radio access technologies (RATs), as shown in a block 610.

The method 600 continues by in accordance with an inter radio access technology (IRAT) redirection procedure by which the radio to transition from a first of the plurality of RATs to a second of the plurality of RATs, monitoring for paging information associated with the first of the plurality of RATs during search for the second of the plurality of RATs, as shown in a block 620.

Referring to method 700 of FIG. 7, the method 700 begins by operating a radio of the wireless communication device in accordance with a first radio access technology (RAT), as shown in a block 710.

The method 700 continues by determining whether or not an inter radio access technology (IRAT) redirection procedure is to be performed, as shown in a decision block 720.

If such an IRAT redirection procedure is to be performed, then the method 700 operates by operating a radio of the wireless communication device in accordance with searching for second RAT, as shown in a block 730. In accordance with such operations of the block 730, the method 700 operates by checking for communications (e.g., pages) within first RAT during searching for second RAT, as shown in a block 732.

Alternatively, if such an IRAT redirection procedure is not to be performed, then the method 700 operates by continuing operating the radio of the wireless communication device in accordance with a first RAT, as shown in the block 710.

Referring to method 800 of FIG. 8, the method 800 begins by operating a radio of the wireless communication device in accordance with a first radio access technology (RAT), as shown in a block 810.

The method 800 continues by determining whether or not an inter radio access technology (IRAT) redirection procedure is to be performed, as shown in a decision block 820.

If such an IRAT redirection procedure is to be performed, then the method 800 operates by operating the radio of the wireless communication device in accordance with searching for a second RAT, as shown in a block 830.

Alternatively, if such an IRAT redirection procedure is not to be performed, then the method 800 operates by continuing operating the radio of the wireless communication device in accordance with a first RAT, as shown in the block 810.

The method 800 continues by determining whether or not there has been success in the second RAT search, as shown in a decision block 840. If the search for the second RAT has been successful, then the method 800 continues by operating the radio of the wireless communication device in accordance with the second RAT, as shown in a block 850.

Alternatively, if the search for the second RAT has not been successful, then the method 800 operates by checking for communications (e.g., pages) within first RAT, as shown in the block 860. Subsequently, the method 800 operates by continuing operating the radio of the wireless communication device in accordance with searching for a second RAT, as shown in a block 830.

It is also noted that the various operations and functions as described with respect to various methods herein may be performed within a variety of types of communication devices, such as using one or more processors, processing modules, etc. implemented therein, and/or other components therein including one of more baseband processing modules, one or more media access control (MAC) layers, one or more physical layers (PHYs), and/or other components, etc.

In some embodiments, such a processor, circuitry, and/or a processing module, etc. (which may be implemented in the same device or separate devices) can perform such processing to generate signals for communication with other communication devices in accordance with various aspects of the invention, and/or any other operations and functions as described herein, etc. or their respective equivalents. In some embodiments, such processing is performed cooperatively by a first processor, circuitry, and/or a processing module, etc. in a first device, and a second first processor, circuitry, and/or a processing module, etc. within a second device. In other embodiments, such processing is performed wholly by a processor, circuitry, and/or a processing module, etc. within a singular communication device.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "module", "processing circuit", and/or "processing unit" (e.g., including various modules and/or circuitries such as may be operative, implemented, and/or for encoding, for decoding, for baseband processing, etc.) may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may have an associated memory and/or an integrated memory element, which may be a single memory device, a plurality of memory devices, and/or embedded circuitry of the processing module, module, processing circuit, and/or processing unit. Such a memory device may be a read-only memory (ROM), random access memory (RAM), volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a functional block that is implemented via hardware to perform one or module functions such as the processing of one or more input signals to produce one or more output signals. The hardware that implements the module may itself operate in conjunction software, and/or firmware. As used herein, a module may contain one or more sub-modules that themselves are modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. An apparatus comprising:
a processor; and
a radio, the radio and the processor configured to:
support communication with at least one wireless communication device based on each of a plurality of radio access technologies (RATs);
monitor for paging information associated with a first of the plurality of RATs during search for a second of the plurality of RATs when performing an inter radio access technology (IRAT) redirection procedure to transition from the first of the plurality of RATs to the second of the plurality of RATs;
abort the IRAT redirection procedure and support the communication only based on the first of the plurality of RATs when paging information associated with the first of the plurality of RATs is detected by the radio during the search for the second of the plurality of RATs; and
continue the IRAT redirection procedure to transition from the first of the plurality of RATs to the second of the plurality of RATs when no paging information associated with the first of the plurality of RATs is detected by the radio during the search for the second of the plurality of RATs.

2. The apparatus of claim 1, wherein the radio and the processor are further configured to:
re-tune to the first of the plurality of RATs to check for the paging information associated with the first of the plurality of RATs after a failure to connect via the second of the plurality of RATs within a predetermined period of time.

3. The apparatus of claim 1, wherein the radio and the processor are further configured to:
re-tune to the first of the plurality of RATs to check for the paging information associated with the first of the plurality of RATs a plurality of times during the search for the second of the plurality of RATs, wherein the plurality of times are spaced apart periodically within a time period associated with the search for the second of the plurality of RATs.

4. The apparatus of claim 1, wherein the paging information associated with the first of the plurality of RATs corresponding to at least one discontinuous reception cycle (DRX) of the first of the plurality of RATs.

5. The apparatus of claim 1 further comprising:
a mobile wireless communication device; and
the radio and the processor configured to connect with a base station to support the communication with the at least one wireless communication device.

6. An apparatus comprising:
a processor; and
a radio, the radio and the processor configured to:
support communication with at least one wireless communication device based on each of a plurality of radio access technologies (RATs); and
monitor for paging information associated with a first of the plurality of RATs during search for a second of the plurality of RATs when performing an inter radio access technology (IRAT) redirection procedure to transition from the first of the plurality of RATs to the second of the plurality of RATs including monitoring for the paging information by re-tuning the radio to the first of the plurality of RATs to check for the paging information associated with the first of the plurality of RATs a plurality of times during the search for the second of the plurality of RATs.

7. The apparatus of claim 6, wherein the radio and the processor are further configured to:
re-tune to the first of the plurality of RATs to check for the paging information associated with the first of the plurality of RATs after a failure to connect via the second of the plurality of RATs within a predetermined period of time.

8. The apparatus of claim 6, wherein the radio and the processor are further configured to:
search for the second of the plurality of RATs during a plurality of non-uniform periods of times within a time period associated with the search for the second of the plurality of RATs.

9. The apparatus of claim 6, wherein the plurality of times are spaced apart periodically within a time period associated with the search for the second of the plurality of RATs.

10. The apparatus of claim 6, wherein the paging information associated with the first of the plurality of RATs corresponds to at least one discontinuous reception cycle (DRX) of the first of the plurality of RATs.

11. The apparatus of claim 6, wherein the radio and the processor are further configured to:
abort the IRAT redirection procedure and effectuate communication only based on the first of the plurality of RATs when paging information associated with the first of the plurality of RATs is detected by the radio during the search for the second of the plurality of RATs.

12. The apparatus of claim 6, wherein the radio and the processor are further configured to:
continue the IRAT redirection procedure to transition from the first of the plurality of RATs to the second of the plurality of RATs when no paging information associated with the first of the plurality of RATs is detected by the radio during the search for the second of the plurality of RATs.

13. The apparatus of claim 6 further comprising:
a mobile wireless communication device; and
the radio and the processor configured to connect with a base station to support the communication with the at least one wireless communication device.

14. A method for execution by a wireless communication device communication device, the method comprising:
operating a radio of the wireless communication device to support communication with at least one additional wireless communication device based on each of a plurality of radio access technologies (RATs); and monitoring for paging information associated with a first of the plurality of RATs during search for a second of the plurality of RATs when performing an inter radio access technology (IRAT) redirection procedure to transition from the first of the plurality of RATs to the second of the plurality of RATs including monitoring for the paging information by re-tuning the radio to the first of the plurality of RATs to check for the paging information associated with the first of the plurality of RATs a plurality of times during the search for the second of the plurality of RATs.

15. The method of claim 14 further comprising:
operating the radio to re-tune to the first of the plurality of RATs to check for the paging information associated with the first of the plurality of RATs after a failure to connect via the second of the plurality of RATs within a predetermined period of time.

16. The method of claim 14, wherein the plurality of times are spaced apart periodically within a time period associated with the search for the second of the plurality of RATs.

17. The method of claim 14, wherein the paging information associated with the first of the plurality of RATs corresponds to at least one discontinuous reception cycle (DRX) of the first of the plurality of RATs.

18. The method of claim 14 further comprising:
when paging information associated with the first of the plurality of RATs is detected by the radio during the search for the second of the plurality of RATs, aborting the IRAT redirection procedure and supporting the communication only based on the first of the plurality of RATs.

19. The method of claim 14 further comprising:
when no paging information associated with the first of the plurality of RATs is detected by the radio during the search for the second of the plurality of RATs, continuing the IRAT redirection procedure to transition from the first of the plurality of RATs to the second of the plurality of RATs.

20. The method of claim 14, wherein the wireless communication device is a mobile wireless communication device; and further comprising:
operating the radio to connect with a base station to support the communication with the at least one additional wireless communication device.

* * * * *